March 17, 1953  C. V. BRADY ET AL  2,631,630
MOISTUREPROOF BAG
Filed July 26, 1951  3 Sheets-Sheet 1
FIG. 1.
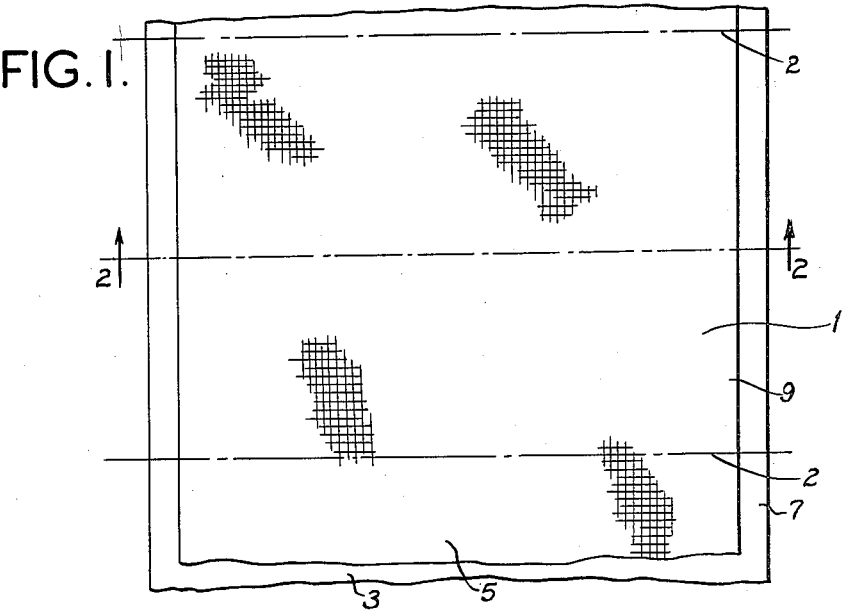
FIG. 2.
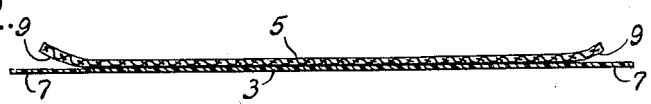
FIG. 3.
FIG. 4.
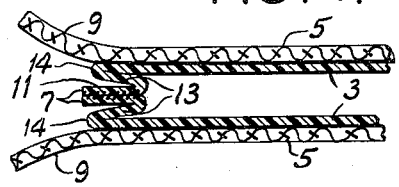
FIG. 5.
FIG. 6.
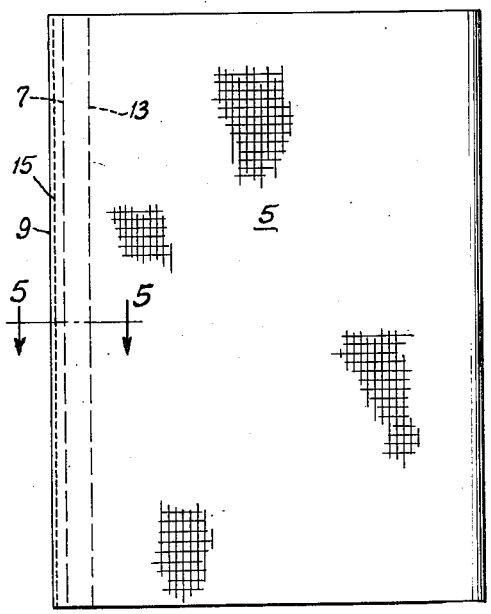
FIG. 7.
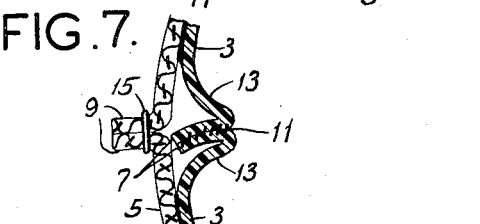
Charles V. Brady,
August F. Ottinger,
Inventors.
Koenig and Pope
Attorneys.

March 17, 1953   C. V. BRADY ET AL   2,631,630
MOISTUREPROOF BAG
Filed July 26, 1951   3 Sheets-Sheet 2
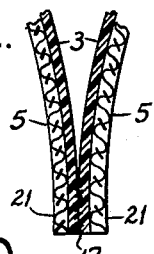
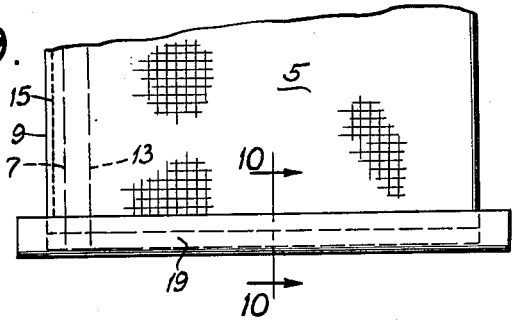
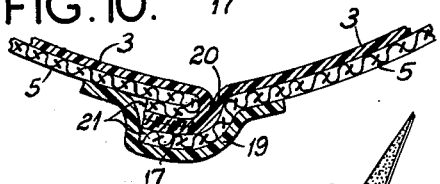
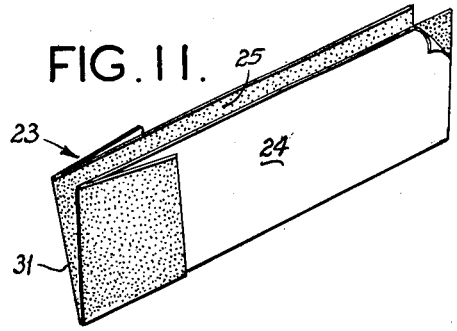
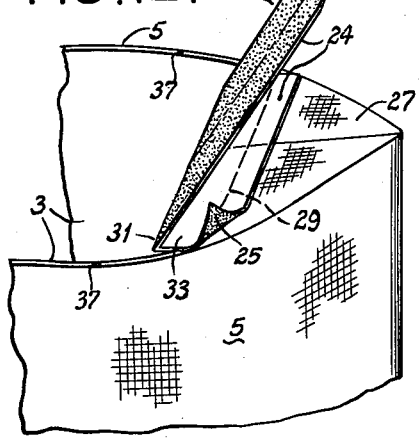
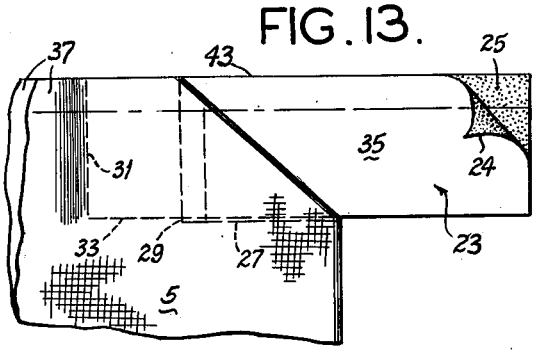
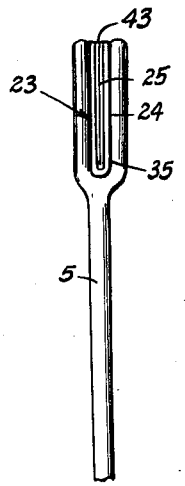
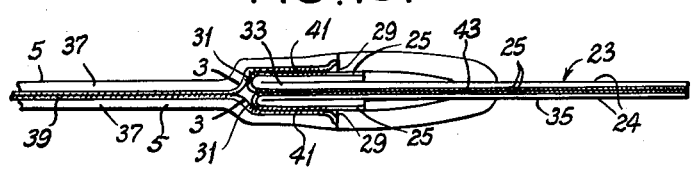
Charles V. Brady,
August F. Ottinger,
Inventors.
Koenig and Pope,
Attorneys.

March 17, 1953  C. V. BRADY ET AL  2,631,630
MOISTUREPROOF BAG

Filed July 26, 1951  3 Sheets-Sheet 3

Charles V. Brady,
August F. Ottinger,
Inventors.
Koenig and Pope.
Attorneys.

Patented Mar. 17, 1953

2,631,630

UNITED STATES PATENT OFFICE 2,631,630

MOISTUREPROOF BAG

Charles V. Brady and August F. Ottinger, St. Louis, Mo., assignors to Bemis Bro. Bag Company, St. Louis, Mo., a corporation of Missouri Application July 26, 1951, Serial No. 238,724

7 Claims. (Cl. 150—1)

This invention relates to moistureproof bags and their manufacture and has as its object the provision of easily manufactured and stronger bags incorporating substantially stress-free thermoplastic liners of the seamed type having no needle holes through the liner. The invention constitutes an improvement upon bags and their manufacture such as shown in U. S. Patent 1,702,592.

Briefly, the bags described herein have a thermoplastic liner which, in the absence of the enclosing baler, would be freely expansible to greater dimensions (both girthwise and lengthwise) than the baler, the liner thereby being completely relieved of tension stresses, particularly at its seams. The liner may be spot pasted to the enclosing baler to derive a desired amount of temporary support from the baler, before and during filling in order to prevent liner collapse. The spot pasting then allows for detachment after bag filling which allows the liner to shift inside the baler without tearing. It is to be understood however that in some cases solid, instead of spot pasting may be used. A portion of the liner along one side is loosely turned or folded inward to form a floating expansible gusset extending along the side of the bag. Permanently heat-sealed end portions are folded under closure tapes which are adhesively fastened exteriorly to the side walls of the baler.

In a preferred method of manufacture, the bag is formed by folding a sheet of baler material, such as fabric, around a liner which has been formed into a flat tube of width greater than the width of the folded baler. A portion of the liner is tucked or folded under the side margins of the baler so as to reduce the width of the flattened liner, and the outwardly projecting margins of the baler are then stitched together. The ends of the resultant two-ply tube are closed by heat sealing together the end margins of the liner and by folding over the end portions of the baler with the sealed end portions of the liner. A holding tape is then adhesively fastened around the folded-over end portions of the bag.

An alternative method of making the bag of this invention is initially to form the liner as a tube around the baler and then turn the resultant blank so that an inturned seam on the liner occurs. After turning, the baler is stitched along its side margins and end closures are formed as before. Thus the turning with the liner tube formed on the outside of the baler blank replaces the step of tucking in a portion of the liner initially located inside a baler blank. The finished bag has a slightly different fold at the side of the liner, but the same advantages are attained. Other features will be in part apparent and in part pointed out hereinafter.

The invention accordingly comprises the steps and sequence of steps, elements and combinations of elements, features of construction, and arrangements of parts which will be exemplified in the methods and structures hereinafter described, and the scope of which will be indicated in the following claims.

In the accompanying drawings, in which several of various possible embodiments of the invention are illustrated, Fig. 1 is a top plan view of a section of webbing from which a bag of this invention is made;

Fig. 2 is a transverse section of the webbing taken on line 2—2 of Fig. 1;

Fig. 3 is a transverse section illustrating an initial step in making the bag;

Figs. 4 and 5 are enlarged partial transverse sections illustrating certain other steps in manufacture, Fig. 5 being taken on line 5—5 of Fig. 6;

Fig. 6 is front elevation of a finished tube from which a bag is to be made;

Fig. 7 is an enlarged partial section at the side seam of an expanded tube illustrating the stress-free condition of the liner seam;

Fig. 8 is an enlarged partial section at an end of the bag showing a preliminary step in the formation of a bottom end closure;

Fig. 9 is a partial front elevation showing a finished end closure;

Fig. 10 is an enlarged partial section at the end of the bag illustrating the stress-free condition of the liner seam;

Fig. 11 is a perspective view of a folded valve insert employed in making a valved bag of this invention, a part being peeled back for the purpose of illustration;

Fig. 12 is a partial perspective view showing the bag mouth and the attached valve insert, a part being peeled back;

Fig. 13 is a partial front elevation of the bag mouth showing a heat-sealing step in the formation of the mouth closure, a part being peeled back;

Fig. 14 is a right-end view of Fig. 13;

Fig. 15 is a top view of Fig. 13 showing heat seals at the bag mouth;

Similar reference characters indicate corresponding parts throughout the several views of the drawings. It will be understood that for drawing purposes thicknesses of thin sheets are exaggerated for better illustration.

Figure 16:
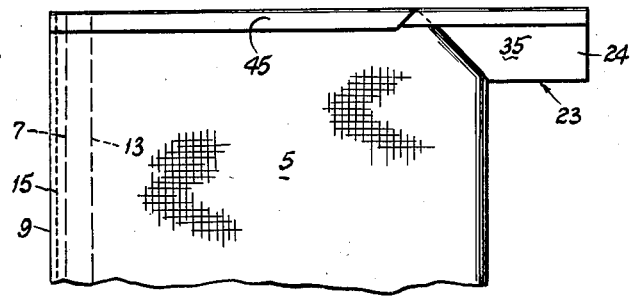
Fig. 16 is a partial front elevation of the bag showing a next step in the formation of the mouth closure.

In Fig. 1 of the drawings, there is shown a two-ply web adapted to be cut into bag-forming blanks 1 as indicated by lines 2. This two-ply web is continuously formed by pasting a sheet 3 of moisture proof liner material to a comparatively narrower sheet 5 of relatively stronger baler material so that the margins 7 of the liner project beyond the margins 9 of the baler. The width of the liner 3 is slightly greater than twice the desired bag width while the width of the baler 5 corresponds approximately to twice the desired bag width. The moistureproof liner 3 is preferably formed from thermoplastic sheet material, such as polyethylene, polyvinyl acetate, rubber hydrochloride, polyvinylidene chloride, or the like, and relatively to the baler, is weak. The baler 5 is formed of relatively stronger material such as textile or heavy paper in order to provide a composite web which is both strong and moistureproof. In combining the two webs 3 and 5, the outer margins 9 of the baler 5 are not secured to the liner but are left unadhered as illustrated in Fig. 2. Otherwise the two webs may be pasted together over a substantial area or they may be spot pasted, the latter being preferred for reasons that will be apparent.

Next, the composite web may be segmented at 2 into the bag blanks 1 of the desired bag length, the width of the composite web being approximately twice the desired bag width. The bag blanks are folded in half (Fig. 3) with the liner on the inside and with the edges 7 projecting marginally outward from between the margins 9 of the baler. The outwardly projecting contiguous margins 7 of the thermoplastic material are then heat sealed together.

A moistureproof seam 11 is thereby formed at the outer side margins of the liner. This seam 11 is pushed inward into the bag with adjacent floating or hinge portions 13 of the liner folding inward at 14 as shown in Fig. 4. The portions 13 are the unadhered portions of the liner previously contiguous with respect to the marginal portions 9 of the baler. This step reduces the width of the liner to less than that of the baler so that the margins 9 of the baler project outward and, as shown in Fig. 5, may be stitched together as at 15 without catching any of the liner material. The baler margins 9 are shown as stitched flat at 15 but, if desired, may be folded over in various known ways prior to stitching to provide what are known as folded or export seams. These seam variations are not illustrated, being old per se.

From the above, it will be observed that the liner is formed from material which is wider than the baler material. A flat tube is then formed from the liner material, this tube having a transverse dimension greater than that of the baler material which is folded around the liner. The transverse dimension of the liner is then reduced, as by tucking in a portion at the side, so that this dimension is less than that of the folded baler. The baler is then formed into a tube which is of a girth smaller than the expansible girth of the liner. Consequently, the heat-sealed side seam of the liner is completely protected against forces tending to separate it. Moreover, no stitching intersects the liner. This condition is shown in Fig. 7 of the drawings, wherein portions 13 of the liner are loosely floating inside the baler tube, thereby protecting the heat-sealed seam 11 against rupture. All stresses are absorbed by the stitched seam 15 of the baler.

Although the description heretofore contemplates forming a two-ply blank and then successively seaming the liner and the baler, it will be understood that the liner may be formed as a tube independently of the baler and the baler then formed as a tube around the liner, the tubular liner having been first reduced in width so as to permit the formation of a baler tube having a smaller girth than the girth of the liner tube. Bag blanks can then be segmented from the tube.

As shown in Figs. 8, 9 and 10, a stress-free bag-end closure is formed by heat sealing together at 17 the contiguous end portions of the liner. The heat-sealed portion of the liner is then folded over with adjacent portions 21 of the baler, and a folded holding tape 19 is pasted over the folded-over end portions 21 of the baler. The pasting extends on both sides of the folded-over portions 21 so that the stresses, as shown in Fig. 10, are on the baler 5 and holding tape 19 and not on the liner 3. The result in effect is a liner which will give with the baler at hinge portions 20 without setting up internal stresses. The position of parts after filling of the bag is illustrated in Fig. 10, wherein it is shown that the holding tape 19 spreads out to absorb the stresses applied to the outer portions 5 of the baler. The folded-over portions 21 will be loosely floating beneath the holding tape.

The mouth or top end of the bag may be closed in a similar manner, or the mouth may be provided with a valve of the type shown in Figs. 11–17. In making the valved bag, a valve insert 23 is employed. This valve insert is formed from a generally rectangular blank of valve material 24, such as kraft paper, and has a layer 25 of heat-sealable thermoplastic material of the type mentioned heretofore on one side of the paper. The heat-sealable material 25 may be cast on in a known manner. A corner at the top side fold of the bag is then folded in to form a generally triangular valve flap 27 and the valve insert 23 is applied to its inner margin 29, the insert projecting inward. As shown, the heat-sealable coating 25 forms a seal with the textile bag baler material 5.

The valve insert 23 is then folded outward along a transverse line 31 spaced inward from the inner margin 29 of the valve flap in order to provide an inwardly extending valve extension 33 and an outwardly extending valve sleeve portion 35. Upper marginal portions 37 of the bag are then brought together so that the valve flap 27 and valve insert 23 are median folded with the valve sleeve portion 35 projecting outward from within the valve flap and valve extension 33 (Fig. 13).

Figure 17:
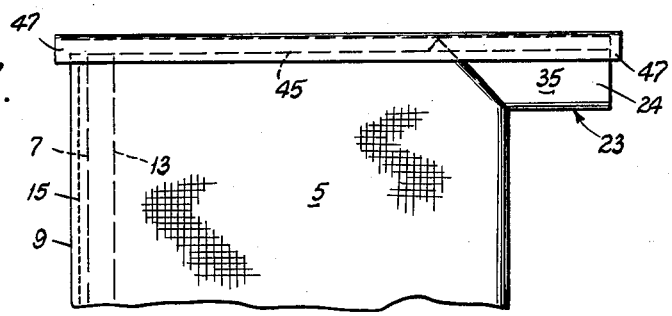
Fig. 17 is a partial front elevation showing the finished bag with the mouth closure tape applied and a valve shown as it appears prior to filling of the bags.

The top marginal portions 37 of the bag are then heat sealed together so that a heat seal 39 extends across the top of the bag from the inner edge 31 of the valve extension to the opposite side seam. The top marginal portions of the valve extension 33 are heat sealed at 41 to the liner 3 and the valve sleeve 35 is completely sealed across its top at 43. The heat-sealed portions are then folded back as shown at 45 in Fig. 16; and a holding tape 47, of the type used for the bottom end closure, is adhesively affixed around the folded-over portions 45 of the bag mouth and valve as shown in Fig. 17.

The result is a valve which is moistureproof from the inside of the bag, with moistureproof seams 39, 41 and 43 across the top of the bag, the valve extension 33 and top of the valve sleeve 35, respectively. After filling of the bag, the outwardly extending valve sleeve 35 may be heat sealed, to seal the bag completely, and rolled up or folded into the valve flap.

Figure 18:
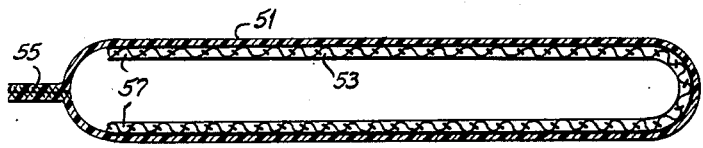
Fig. 18 is a transverse section similar to that shown in Fig. 3, illustrating an alternative method of making the bag of this invention; and, Fig. 19 is a partial transverse section similar to that of Fig. 5, illustrating the finished side seam of a tube formed in the manner of Fig. 18.
Figure 19:
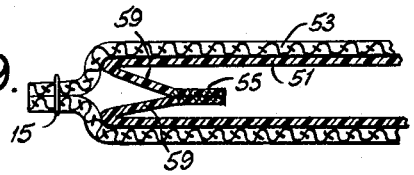

Referring to Figs. 18 and 19, there is shown an alternative bag construction of this invention. A blank of the type shown in Fig. 1 having a thermoplastic liner sheet 51 and a textile baler sheet 53 is folded upon itself with the liner 51 on the outside, and the marginal portions of the liner are heat sealed together at 55. The partially formed tube is then turned so that the liner 51 is on the inside of the baler 53. Unadhered marginal portions 57 of the baler project outward and the seam 55 of the liner appears as an inturned seam with unadhered loosely floating or hinge portions 59 of the liner located between the seam 55 and the baler. The margins 57 of the baler are then stitched as before, to provide a finished tube wherein the expansible girth of the liner is greater than that of the baler. End closures may be formed as before.

It will be noticed that the inturned portions of the liner side seam are particularly adapted to form a tight seal at the corners of the bag inasmuch as the thermoplastic material is heat sealable to itself.

In summary, among the various advantages of the invention will be noted the provision of permanent seams which are particularly adapted to withstand wide variations in temperature and which are chemically inert; the provision of a liner having stress-relieved seams; and the provision of a liner which is detachably supported upon the baler preferably by spot pasting, this construction being desirable in preventing collapse of the liner during filling operations although permitting some amount of shifting after filling. The methods described readily permit the manufacture of a bag wherein the liner is larger than the baler, particularly a liner having heat-sealed seams.

For brevity it may be said, so far as is concerned the ultimate product (a bag) that it consists of an outer relatively strong baler having an outer seam which is fastened as by stitching or otherwise, independently of a possibly relatively weaker waterproof liner, preferably a thermoplastic one. The liner in any plane section through the bag has a free girth greater than the adjacent free girth of the baler. This free girth is provided by means of a gusset, preferably formed by a permanent preferably heat-sealed area at the margins of the liner, which margins are independent of any seaming operations performed on the baler margins and which are joined with the baler walls by means of flexible portions unadhered to each other or to the bag walls.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A moistureproof bag of the type having a liner of relatively weak moistureproof material and a baler of relatively strong water-pervious material, the liner per se being of greater girth than the baler and the bag being formed along at least one side with marginal portions of the liner loosely folded into the bag along side folds and with marginal portions of the baler projecting outward beyond said side folds, the outwardly projecting marginal portions of the baler being stitched together along a line spaced outward from the side folds of the liner and the infolded marginal portions of the liner being integrally cohered together in inwardly spaced relation from its side folds, thereby providing hinge portions of the liner, permitting unrestrained expansion of the liner within the baler.

2. A moistureproof bag of the type having a liner of thermoplastic sheet material and a baler of textile material, the bag comprising a two-ply blank having a layer of thermoplastic sheet material and a layer of textile baler material, the liner sheet being wider than the baler sheet and being spot pasted to the baler sheet with marginal portions of the baler unadhered to the liner, the blank being folded in half with said marginal portions thereof adjacent one another and with the unadhered marginal portions of the liner folded into the bag, the unadhered marginal portions of the baler projecting outward beyond the liner and being secured together by stitching, the infolded marginal portions of the liner being heat sealed together in inwardly spaced relation from said stitching, and the expansible girth of the liner being greater than the girth of the baler.

3. A moistureproof bag of the type having a thermoplastic liner and a textile baler, the bag being formed from a composite blank of thermoplastic and textile sheets, the thermoplastic sheet being larger in a girthwise direction than the textile sheet, the side margins of the textile sheet being stitched together, the side margins of the thermoplastic sheet being heat sealed together and tucked loosely into the bag clear of the stitching, the margins at an end of the liner being heat sealed together and folded over, the adjacent end margins of the textile material also being folded over, and a holding tape adhered exteriorly around the folded-over portions of the textile material.

4. In a valved moistureproof bag of the type having a thermoplastic liner, a corner of the bag mouth being folded in to form a valve flap, a valve insert having a heat-sealable surface marginally adhered across the valve flap, this insert being transversely and longitudinally folded upon itself to provide a valve extension projecting inward beyond the valve flap and a tuck-in sleeve projecting outward within the valve flap, the upper inside portions of the tuck-in sleeve being heat sealed together, the upper outside portions of the valve extension being heat sealed to contiguous marginal portions of the thermoplastic liner, and other top marginal portions of the liner being heat sealed together.

5. A valved bag as set forth in claim 4, wherein the sealed portions at the top of the bag are folded over and held by a tape adhered to the bag side walls, thereby relieving the heat seals against stresses from within the bag, the tape taking such stresses at the top of the bag.

6. A valved bag as set forth in claim 4, wherein the valve extension portion of the valve insert is marginally heat sealed to the outer face of the valve flap.

7. A valved bag as set forth in claim 4, wherein the valve insert is coated with thermoplastic material over one side, the valve insert being folded with the thermoplastic material facing inward in the portion of the insert forming the valve sleeve and facing outward in the portion of the insert forming the valve extension.

CHARLES V. BRADY.
AUGUST F. OTTINGER.

REFERENCES CITED

The following references are of record in the file of this patent:

UNITED STATES PATENTS

| Number | Name | Date |
| --- | --- | --- |
| 2,061,375 | Cramer | Nov. 17, 1936 |